(12) United States Patent
Wieczorek et al.

(10) Patent No.: US 7,549,457 B2
(45) Date of Patent: Jun. 23, 2009

(54) SILICONE SHADE

(75) Inventors: Joseph P. Wieczorek, Lake Orion, MI (US); Bryan Busha, Grand Blanc, MI (US)

(73) Assignee: Irvin Automotive Products, Inc., Pontiac, MI (US)

( * ) Notice: Subject to any disclaimer, the term of this patent is extended or adjusted under 35 U.S.C. 154(b) by 286 days.

(21) Appl. No.: 11/209,106

(22) Filed: Aug. 22, 2005

(65) Prior Publication Data

US 2007/0039701 A1 Feb. 22, 2007

(51) Int. Cl.
*E06B 9/56* (2006.01)

(52) U.S. Cl. .................................... 160/318; 160/323.1

(58) Field of Classification Search ................ 160/318, 160/309, 312, 313, 323.1, 370.22, 23.1, 317, 160/316, 191, 192; 296/37.16, 97.7, 97.8
See application file for complete search history.

(56) References Cited

U.S. PATENT DOCUMENTS

| | | | |
|---|---|---|---|
| 12,271 A * | 1/1855 | Chamberlain et al. ....... 160/318 |
| 1,731,047 A | 10/1929 | Holtzman | |
| 1,965,496 A * | 7/1934 | Hesse ......................... 160/313 |
| 2,351,822 A | 6/1944 | Lauterbach | |
| 2,543,118 A * | 2/1951 | Maffei et al. ................ 160/23.1 |
| 3,909,060 A | 9/1975 | Katayama | |
| 4,139,231 A | 2/1979 | Lang et al. | |
| 4,168,094 A | 9/1979 | Yagi | |
| 4,373,569 A * | 2/1983 | Barettella ..................... 160/263 |
| 4,480,675 A * | 11/1984 | Berkemeier ............... 160/121.1 |
| 4,484,777 A | 11/1984 | Michel | |
| 4,671,557 A | 6/1987 | Lemp | |
| 4,781,234 A | 11/1988 | Okumura et al. | |
| 5,031,682 A | 7/1991 | Tedeschi | |
| 5,544,689 A | 8/1996 | Wegner | |
| 5,685,354 A * | 11/1997 | Kim ............................ 160/122 |
| 5,711,568 A * | 1/1998 | Diem et al. ................ 296/37.16 |
| 5,934,354 A * | 8/1999 | Price et al. .............. 160/370.22 |
| 6,125,908 A * | 10/2000 | Ament et al. .............. 160/323.1 |
| 6,279,639 B1 * | 8/2001 | Schlecht et al. ............. 160/23.1 |
| 6,312,036 B1 | 11/2001 | Ehrenberger et al. | |
| 6,607,235 B2 | 8/2003 | McGrath, Jr. | |

* cited by examiner

*Primary Examiner*—David Purol
(74) *Attorney, Agent, or Firm*—Raggio & Dinnin, P.C.

(57) ABSTRACT

A security shade for use in an automotive vehicle. The security shade includes a roll tube having shade panel affixed to the roll tube at one end thereof. The security shade also includes a center bearing arranged around the cord and within the roll tube. The security shade further includes a compression bearing arranged at each end of the tube. The security shade may also include an end cap arranged over each end of the tube and compression bearing.

10 Claims, 6 Drawing Sheets

SILICONE SHADE

BACKGROUND OF THE INVENTION

1. Field of the Invention

The present invention generally relates to security shades and more particularly relates to a security shade for use in an automotive vehicle.

2. Description of Related Art

Security shades have been known for many years in the art. Some of the many styles of motor vehicles do not provide covered areas for storing cargo or other personal items. In these vehicles any articles in the cargo area could be easily viewed from the exterior of the vehicle. To hide these articles from view motor vehicle manufactures typically provide a flexible security shade or panel that can be extended to cover the cargo area and prevent anyone outside the vehicle from readily viewing any stored articles.

Many prior art security shades generally include a flexible fabric panel, which is wrapped onto a roller tube and mounted to a support structure on the vehicle. The roller tube is rotationally biased so that the panel can be extended to cover the compartment area and retracted onto the roller tube for storage when not in use. The end of the shade panel is normally provided with a pull tube or stiffener having a handle that enables the panel to be conveniently extended. The pull tube also includes clips or tabs which engage brackets mounted to the vehicle sidewalls in the cargo area and maintain the panel in its extended position. Many of these prior art security shades are mounted in vehicles such that the roller tube is positioned across one end of the cargo area with the shade panel being extendable rearward toward a vehicles rear cargo door. The security shade is positioned behind a rear seat back which can be folded down to enlarge the cargo area of the vehicle. When the cargo area is enlarged the security shade may be removed to prevent it from obstructing and reducing cargo area. For this and many other reasons, security shades often feature a mounting system which allows them to be removed from and reinstalled into the vehicle. Therefore, the end units and roller tubes for security shades include many components which increase the cost and complexity along with the weight of the overall security shade unit. Many of the prior art security shades require many components to assemble the removable mounting portion of the security shade and rotational biasing components for the roller tube. Generally, this type of assembly requires many hours of individual labor and requires many different components that are adaptable to different vehicle applications including vehicle models, vehicle widths, or orientation of the security shade within the automotive interior.

Therefore, there is a need in the art for an improved security shade for use in an automotive vehicle. There is also a need in the art for a security shade that reduces the weight by reducing metal content while still providing appropriate robustness and durability while extending the cover and retracting the cover onto the roller tube for storage. Furthermore, there is a need in the art for an improved security shade that incorporates a silicone cord into the security shade to reduce the weight of the security shade for easy handling by the automotive customer and improved efficiency of the vehicle for the manufacturer. There is also a need in the art for a security shade that has increased durability and has a retraction system that is easy to assemble and install within the roller tube and within the vehicle interior.

SUMMARY OF THE INVENTION

One object of the present invention may be to provide an improved security shade.

Another object of the present invention may be to provide a security shade having a roll tube with a silicone cord acting as a spring mechanism to retract the security shade to a stored position.

Still a further object of the present invention may be to provide a security shade that is lighter in weight and easier to assemble.

Yet a further object of the present invention may be to provide a lower cost security shade for use in a vehicle.

Still a further object of the present invention may be to provide a security shade system having a compression bearing located on each end of a roll tube.

Yet a further object of the present invention may be to provide a roll tube having a center bearing arranged therein to provide support to a spring mechanism arranged therein.

To achieve the foregoing objects, a security shade for use in a vehicle according to the present invention is disclosed. The security shade includes a roll tube and a shade panel fixed to the roll tube at one end thereof. The security shade also includes a cord arranged within the roll tube and a center bearing arranged around the cord and within the roll tube. A compression bearing is arranged at each end of the roll tube while an end cap is arranged at each end of the tube.

One advantage of the present invention is that it may provide an improved security shade.

Another advantage of the present invention is that it may provide a security shade having a silicone cord arranged therein.

Still a further advantage of the present invention is that it may provide a security shade that is lower in cost and reduces manufacturing and assembly time of the security shade.

Still a further advantage of the present invention may be that the security shade includes a compression bearing located on each end thereof.

Still another advantage of the present invention is that the security shade may be lighter in weight and more maneuverable for occupants of a motor vehicle.

Other objects, features and advantages of the present invention will become apparent from the subsequent description and dependent claims taken in conjunction with the accompanying drawings.

DESCRIPTION OF THE EMBODIMENT(S)

Figure 1:
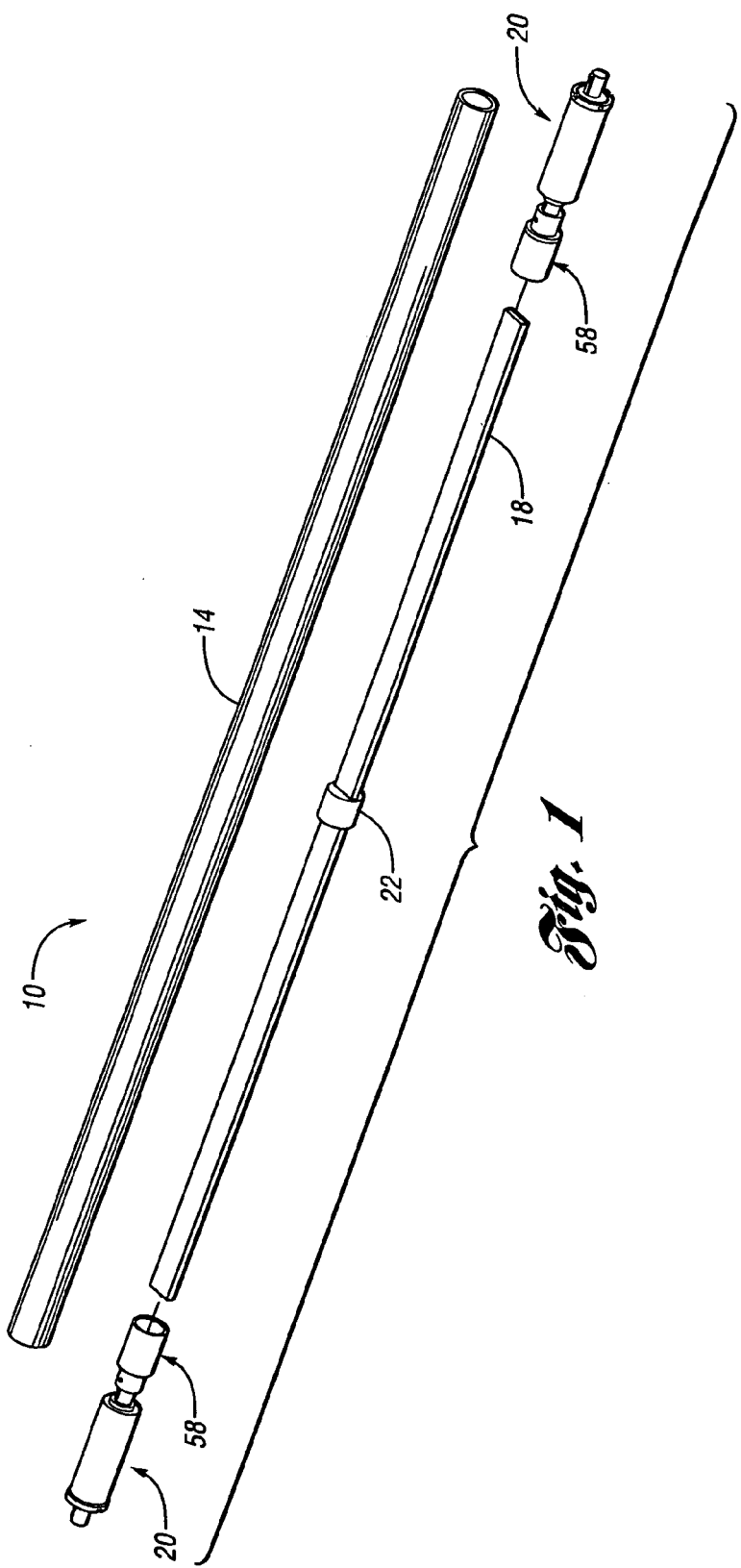
FIG. 1 shows a shade drive for use in the security shade according to the present invention.
Figure 2:
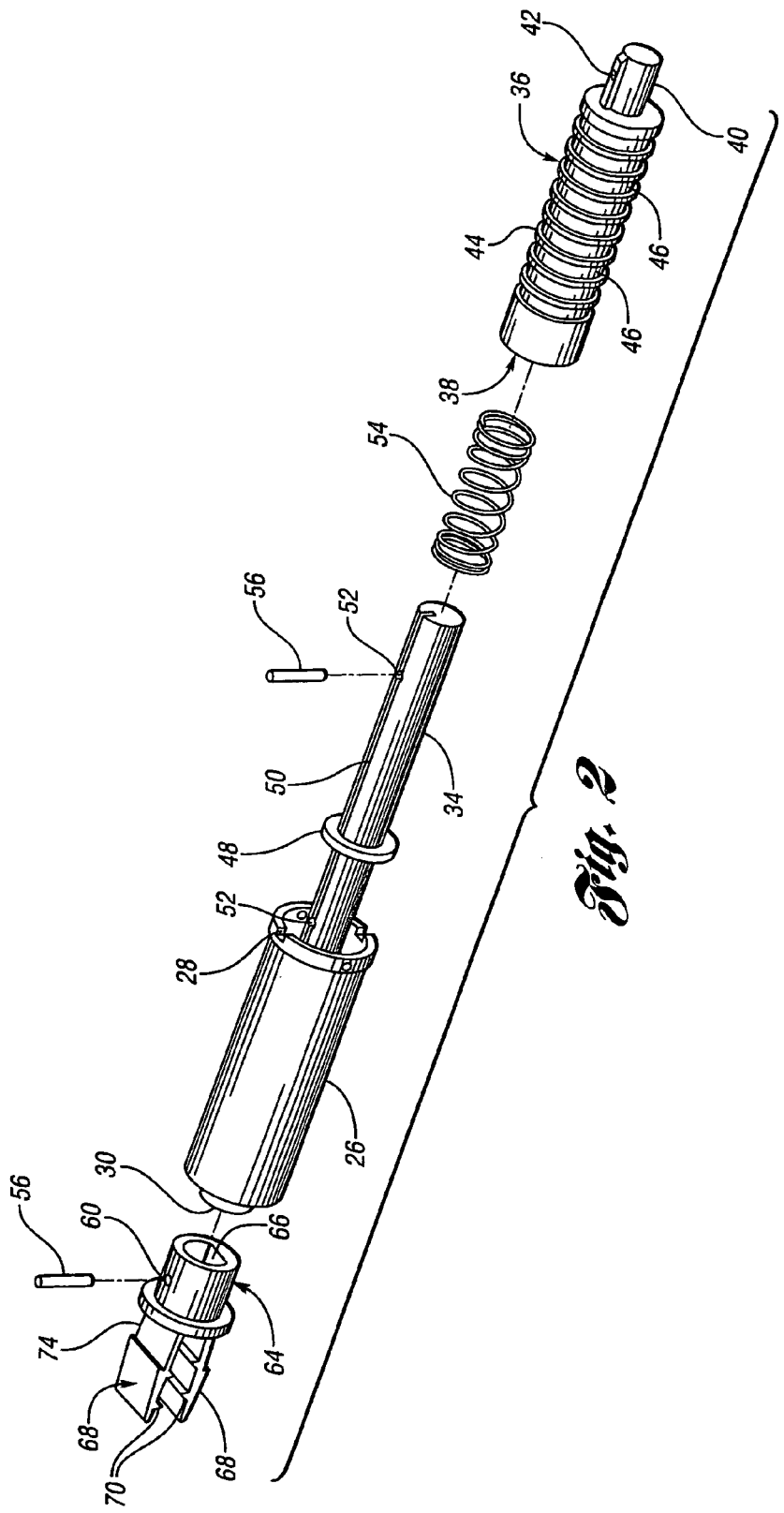
FIG. 2 shows an exploded perspective view of one embodiment of a compression bearing according to the present invention.
Figure 3:
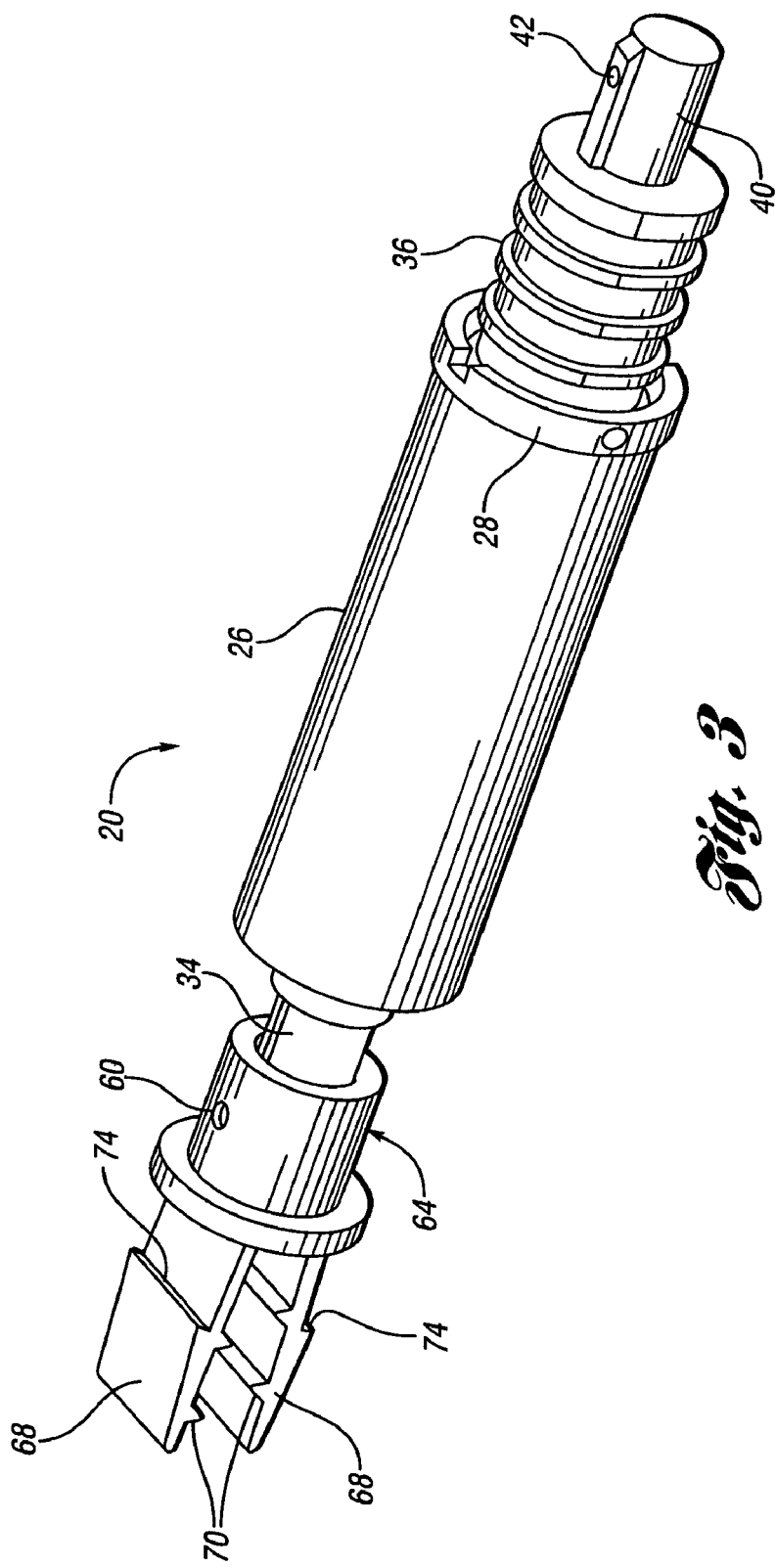
FIG. 3 shows a perspective view of a compression bearing according to the present invention.
Figure 4:
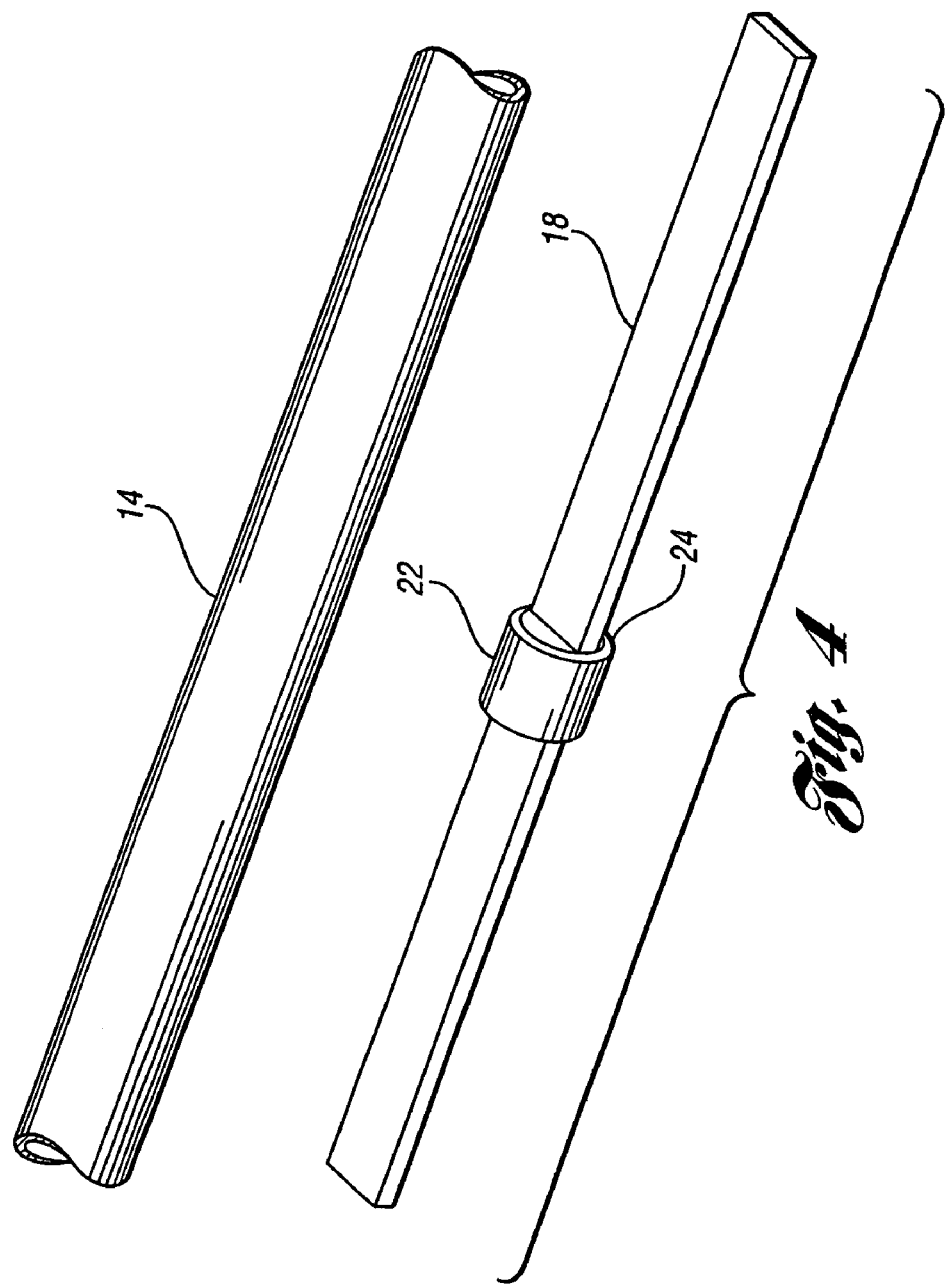
FIG. 4 shows a center bearing used in a security shade according to the present invention.
Figure 5:
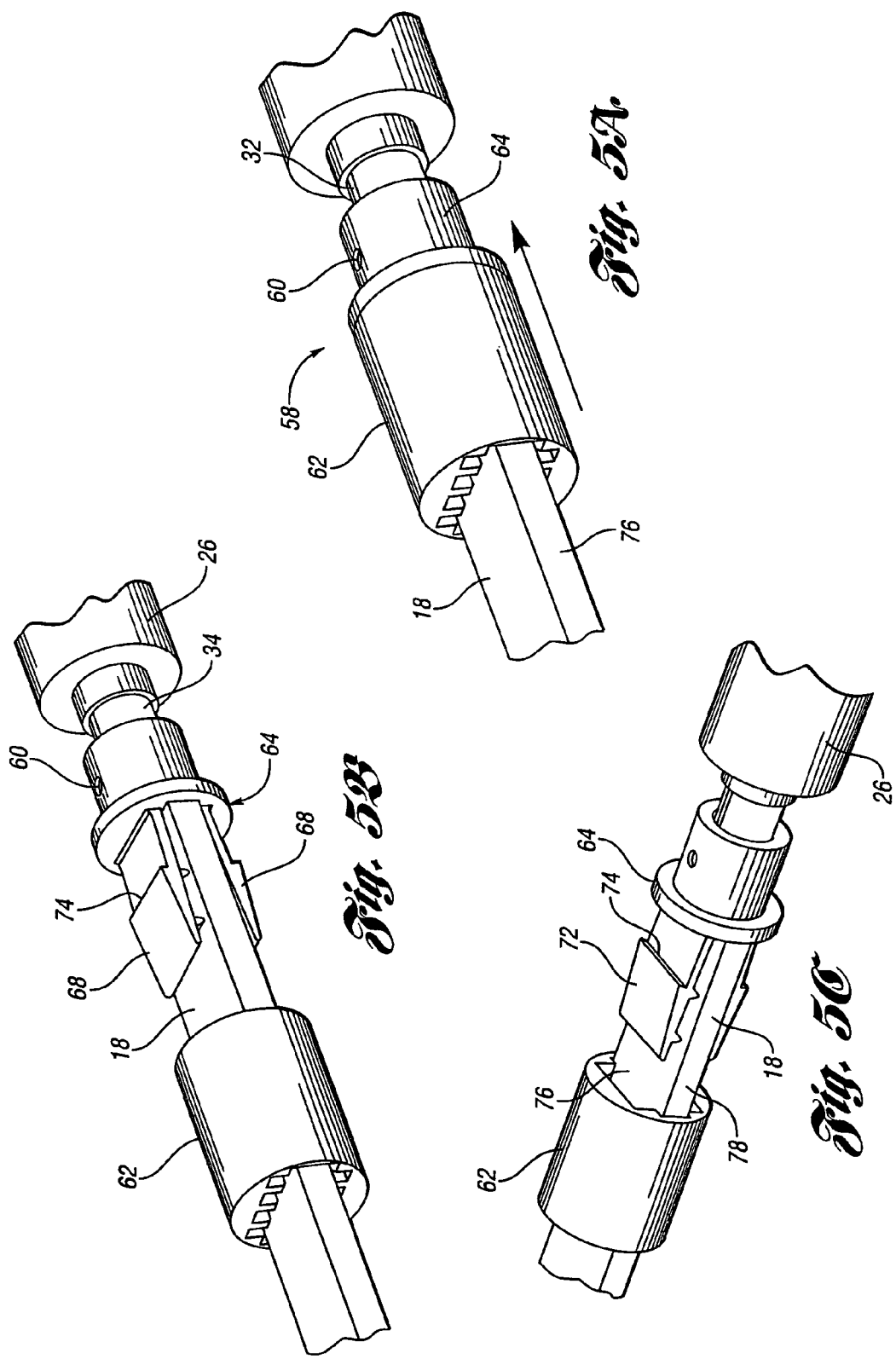
FIGS. 5 A-C shows a cord lock for use in a security shade according to the present invention.

According to the drawings, a shade drive 10 for use with a security shade 12 according to the present invention is shown. It should be noted that the security shade 12 and shade drive 10 is generally used in a motor vehicle but may be used in any type of vehicle that includes a cargo area, wherein the security shade 12 will be used to cover the cargo area and hide contents located within the cargo area from a person outside the motor vehicle. The security shade 12 is generally arranged near a rear seat of an automotive vehicle and pull towards the rear hatch, door or trunk of the motor vehicle into its extended position. The security shade 12 however, may be arranged at other points within the vehicle cargo area. It may extend from one sidewall to another sidewall or from the rear portion of the cargo area toward the rear seat of the automotive vehicle. The security shade 12 will be removable and capable of being stored either inside or outside the motor vehicle when not in use.

The security shade 12 includes a roll tube 14, with a shade panel 16 wound about the roll tube 14 and fixed to the roll tube 14 on one end of the panel 16. The opposite end of the shade panel 16 includes a pull tube or pull handle. The pull handle will be pulled to deploy the shade panel 16 and unroll the shade panel 16 from the roll tube 14. At its fully extended position clips or fasteners on or near the ends of the pull handle or panel 16 are engaged with corresponding brackets in the cargo area sidewalls of the vehicle to retain the shade panel 16 in its extended position covering the cargo area. When the clips are disengaged, the rotational biasing force exerted by the roll tube 14 and associated end support assemblies will wind the shade panel 16 back onto the roll tube 14 for storage.

The roll tube 14 has a predetermined length that will vary based on the automotive vehicle in which the roll tube 14 is being used. The roll tube 14 may be used with a cassette or trim cover which fits over both the roll tube 14 and the wound shade panel 16. The cassette protects the mechanical components of the security shade 10 from inadvertent damage, and prevents foreign objects from interfering with the operation and provides an enhanced appearance for the security shade 10. If a cassette is used a longitudinal slot will be provided through the cassette such that the shade panel 16 can be deployed from and retracted onto the roll tube 14 without interference. It should be noted that an end tube may be arranged over a cassette or over the end of the roll tube 14 to allow for insertion into brackets arranged on the inner wall of the rear cargo area of the vehicle. The roll tube 14 is generally made of a metal material, however, any other hard plastic, composite, fabric, ceramic, natural material, or the like may be used for the roll tube 14 according to the present invention.

Arranged within the roll tube 14 is a rotational biasing mechanism 18. In one contemplated embodiment the rotational biasing mechanism is a cord 18 wherein the cord 18 is made of a silicone material. However, it should be noted that any other plastic, rubber, fabric, metal, composite or the like may be used to create the cord 18 arranged within the roll tube 14. The cord 18 will be used to create the rotational bias force needed to retract the shade panel 16 back onto the roll tube 14 from the extended position of the shade panel 16 in the cargo area of the vehicle. The silicon cord 18 will generally have a rectangular cross-section or may even have a cross-section of adjacent circles formed next to one another. It should be noted that any known shape can be used for the silicone cord 18 depending on the design requirements and rotational biasing force needed to retract the shade panel 16 onto the roll tube 14. It is even contemplated in one embodiment to use a silicone cord 18 that has a plurality of channels through a center portion thereof to reduce weight and increase flexibility of the silicone cord 18. The silicone cord 18 will generally extend a predetermined length within the roll tube 14 depending on the size of the compression bearings 20 arranged within each end of the roll tube 14.

The shade drive 10 also includes a center bearing 22 arranged at or near a midpoint of the roll tube 14. The center bearing 22 generally has a cylindrical shape with an orifice 24 through a midpoint thereof. The cord 18 will be arranged through and slide through the center bearing 22 until the center bearing 22 is arranged at or near a midpoint of the cord 18 and a midpoint of the roll tube 14. Any known manufacturing technique can be used to arrange the center bearing 22 within the roll tube 14. It is also contemplated to use multiple center bearings 22 within the roll tube 14 at different positions with relation to the cord 18. The orifice 24 through the midpoint of the center bearing 22 will mimic the outer shape of the cord 18 and allow for the cord 18 to axially move along the cord 18 but not allow rotation of the center bearing 22 with relation to the cord 18. Therefore, the center bearing 22 is rotatably fixed with respect to the cord 18. The center bearing 22 is also secured to the roll tube 14 such that the center bearing 22 is rotatably fixed with respect to the roll tube 14. The securing of the center bearing 22 to the roll tube 14 will also secure the center bearing 22 at a specific point within the roll tube 14. In one embodiment contemplated the center bearing 22 will be staked to the roll tube 14 from the outside of the roll tube 14 into an outside surface of the center bearing 22. However, it is also contemplated to secure the center bearing 22 within the roll tube 14 by any known fastening technique including but not limited to any mechanical method or apparatus, chemical bonding technique or the like depending on the design requirements for the roll tube 14 and the shade drive components 10 of the security shade 12.

A compression bearing 20 is arranged in each end of the roll tube 14 and is connected to an end of the silicone cord 18. It should be noted that it is also contemplated to have a compression bearing 20 located in only one end of the roll tube 14 and a fixed end member located at the opposite end. The compression bearing 20 includes an outer housing 26 that generally has a cylindrical shape with a circumferential flange 28 on an outer surface on one end thereof. The opposite end of the outer housing 26 includes a neck 30 extending therefrom with an orifice 32 in the neck 30. The outer diameter of the outer housing 26 will be slightly smaller or substantially the same as the inner diameter of the roll tube 14. The outer housing 26 will be arranged within the end of the roll tube 14 and an end of the roll tube 14 will engage with the circumferential flange or lip 28 on one end of the outer housing 26. The outer housing 26 will be rotatably fixed with respect to the roll tube 14 and will rotate with the roll tube 14. Any known fastening method will be used to fasten and secure the outer housing 26 to the roll tube 14 including, but not limited to an interference fit, a fastening methodology such as staking, screws, or chemical bonding techniques all of which are known in the art. The outer housing 26 generally is made of a metal material however any plastic, composite, ceramic, fabric, paper or natural material may also be used to make the outer housing 26.

The compression bearing 20 also includes an axle 34 arranged within an inner housing 36. The inner housing 36 generally has a cylindrical shape that includes an inner bore 38 extending a predetermined length therein. Extending from one end of the inner housing 36 is a post 40 arranged on the midpoint of the end surface. The post 40 includes an orifice 42 through a surface thereof located near the end of the post 40.

The inner housing 36 also includes a first channel 44 through a surface thereof and a second channel 44 located directly opposite the first channel 44. The channel 44 will have a predetermined length and a predetermined shape. The inner housing 36 may also include a plurality of circumferential grooves 46 on an outer surface thereof over a predetermined length of the inner housing 36. The axle 34 is arranged within the inner bore 38 of the inner housing 36. The axle 34 generally has a cylindrical shape with a circumferential flange 48 arranged at a predetermined point along the outer surface of the axle 34. The axle 34 may also include a groove 50 extending along a longitudinal edge thereof. The axle 34 includes a plurality of orifices 52 through a diameter thereof.

A spring 54 is arranged over the axle 34 and between the circumferential flange 48 of the axle 34 and an end of the inner housing 36. In the embodiment shown a metal compression spring 54 is used with a predetermined torque or force. However, it should be noted that any other type of spring including any ceramic, plastic, or metal spring may also be used depending on the design requirements for the compression bearing 20 of the security shade 12 according to the present invention. The axle 34 is secured and fixed to the inner housing 36 via a fastener 56. The fastener 56 in one embodiment is a roll pin 56. A roll pin 56 is arranged through the channels 44 of the inner housing 36 and an orifice 52 of the axle 34 to secure the inner housing 36 to the axle 34 with a spring 54 therebetween in the axial direction. The spring 54 will urge the inner housing 36 in an outward direction away from an end of the axle 34. The inner housing 36 and axle 34 is then arranged within one end of the outer housing 26. An end of the axle 34 will extend through the reduced diameter orifice 32 of the outer housing 26 and connect to a cord lock 58 on that end thereof. Any known type of fastener will be used to secure the cord lock 58 to the end of the axle 34. A roll pin 56 will extend through the orifice 52 of the axle 34 and an orifice 60 of the cord lock 58. The outer housing 26 will rotate with respect to the inner housing 36 and axle 34. The outer housing 26 will also be capable of axial movement with relation to the inner housing 36 and axle 34.

The compression bearing 20 also includes a cord lock 58 that is secured to one end of the cord 18 on one end thereof and secured to the axle 34 on the other end thereof. The cord lock 58 includes a female cord lock member 62 and a male cord lock member 64. The male cord lock member 64 includes a cylindrical shaped body having an inner bore 66 therein with an orifice 60 extending through a diameter of the male cord lock member 64. A first and second arm 68 extends from an opposite end of the male cord lock member 64 and includes at least one finger 70 extending in an inward radial direction from a surface from the first and second arm 68. The first and second arms 68 of the male cord lock 64 also include an angled or ramp surface 72 on the outer surface thereof that includes a locking shoulder 74 at a predetermined position on the outer surface of the first and second arms 68. The width of the arms 68 generally is the same as or slightly less than that of the width of the cord 18 being secured within the male cord lock member 64. The cord 18 is arranged between the first and second arm 68 of the male cord lock member 64 to create a secure connection therebetween. In one embodiment the cord 18 is slid between the first and second arms 68 and into the male cord lock member 64 prior to insertion within the roll tube 14. A cord lock member 58 is arranged on each end of the silicone cord 18.

A female cord lock member 62 generally has a cylindrical shape. The female cord lock member 62 also includes an orifice 76 through a center point thereof. The female cord lock member 62 generally has an outer diameter shape that mimics that of the inner diameter of the roll tube 14. The female cord lock member 62 is arranged over the cord 18 prior to attaching the cord 18 to the male cord lock member 64. The female cord lock member 62 is capable of axial movement along the cord 18 but is not capable of rotation with respect to the cord 18. The female cord lock member inner orifice 76 includes a locking tab 78 that will interact with the angled surface of the male cord lock member 64 and mate and be securely held against the locking shoulder 74 of the male cord lock member 64 after the female cord lock member 62 is slid over the male cord lock member 64. In one embodiment the female cord lock member 62 will have an angled surface on the interior orifice 76 thereof that will mimic that of the male cord lock member 62 and also include a locking tab 78 that will engage with the locking shoulder 74 of the male cord lock member 64 to create a secure attachment between the female cord lock 62 and the male cord lock 64 thus insuring the cord 18 will not dislodge from the cord lock 58. The female cord lock angled surface or locking tab will urge the first and second arm 68 of the male cord lock member 64 into the outer surface of the cord 18 thus engaging the arms 68 and fingers 70 of the male cord lock 64 into the outer surface of the cord 18 and creating a secure connection between the cord 18 and the cord lock 58. The female cord lock 62 once locked in place can only be removed with a tool or any other method that can undo the lock between the female cord lock 62 and the male cord lock 64. The inner orifice 76 of the female cord lock member 62 may include an angled surface at an end thereof followed by a reduced diameter portion and in an increased diameter portion that will form a locking tab 78 that will engage with the locking shoulder 74 on the male cord lock member 64. It should be noted that any other type of locking mechanism or locking process can be used to secure the female cord lock member 62 to the male cord lock member 64 as long as it secures the silicone cord 18 to the cord lock 64 member and the axle 34. It should be noted that all of the parts discussed are generally made of a metal material however, any other plastic, ceramics, composite, natural fabric, cardboard, or paper, etc. may be used for the components described above.

Figure 6:
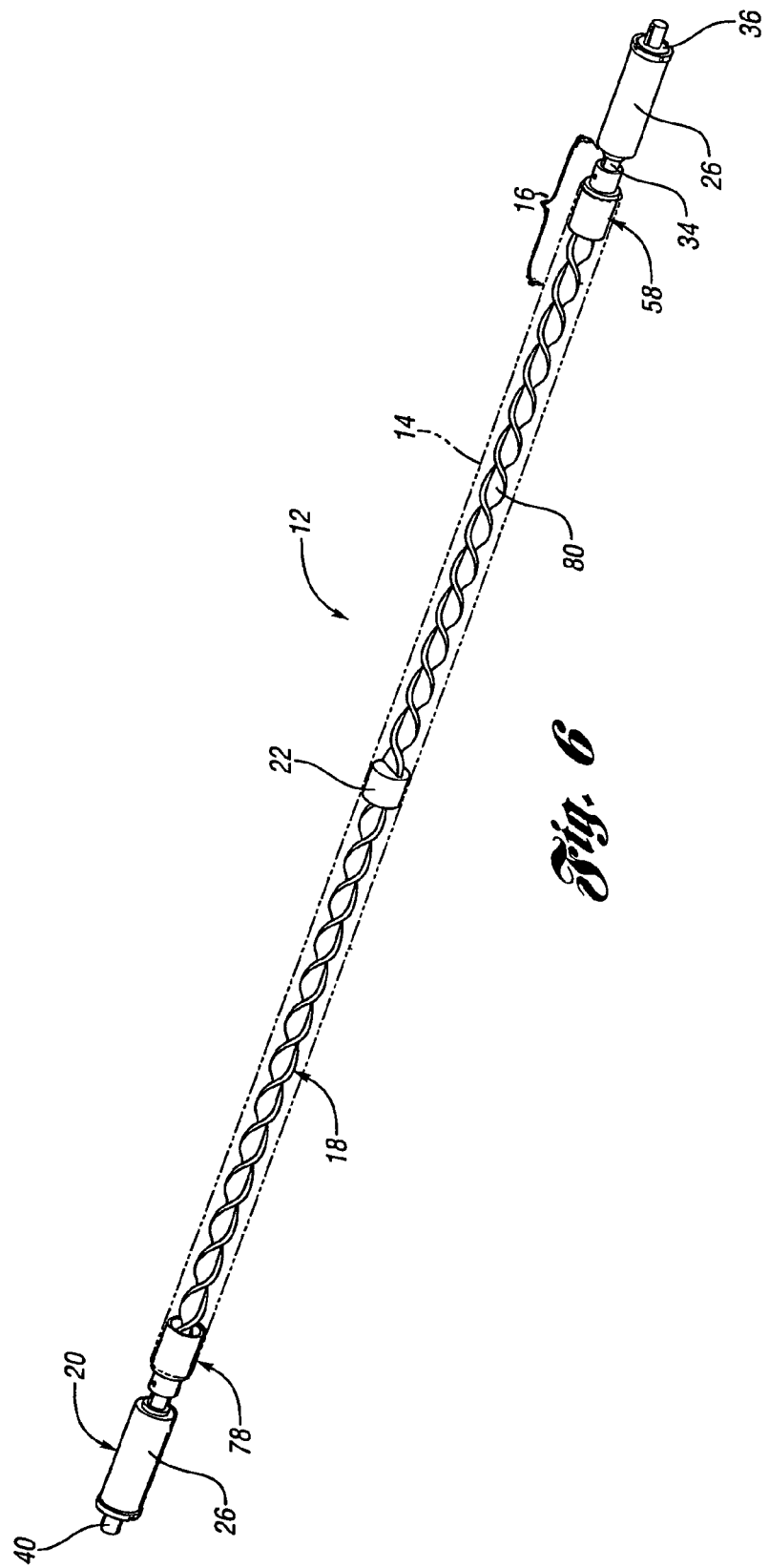
FIG. 6 shows a partial cutaway view of a security shade according to the present invention with the security shade in its extended position.

In operation, when the security shade 12 is in its stored or rolled around position on the roll tube 14 the silicone cord 18 will be flat across the entire length of the roll tube 14 and between the center bearing 22 and cord lock 58 on the ends thereof. When the user of the security shade 12 extends the security shade 12 into its fully extended position the inner housing 36 and axle 34 will be fixed to the brackets in the walls of the cargo area of the vehicle. The inner housing 36 and cord lock 58 are rotatably fixed to the walls of the vehicle. The roll tube 14, outer housing 26 and center bearing 22 are capable of rotation with respect to the inner housing 36 and cord lock 58 will allow the cord 18 to be wound or twisted 80 between the center bearing 22 and each cord lock 58 located on the end of the cord 18. This twisting will create stored energy in the form of a rotational biasing force that will be used to return the security shade 12 to its stored or wound position around the roll tube 14. FIG. 6 shows the silicone cord 18 and the security shade 12 in its extended position. With the cord 18 being twisted, the security shade 12 now has the rotational biasing force necessary to rotate the roll tube 14 and hence the security shade 12 back to its stored position when the operator of the automotive vehicle removes it from its extended position and releases the security shade 12 for retraction. After the security shade 12 is released from its extended position, the cord 18 will unwind or untwist thus placing the center bearing 22, roll tube 14 and outer housing 26 back to its fully retracted position having the silicone cord 18 back to its original flat state with relation to the cord lock 58 and center bearing 22. This will allow for a reduced weight spring mechanism to be used in returning the shade panel 16 to its retracted or stored position from its extended position.

It should be noted that the compression bearings 20 may have a fastener located in the orifice 42 on the post 40 at the end thereof wherein that fastener will engage with a bracket in the walls of the cargo area to ensure the compression bearing 20 is rotatably fixed with respect to the vehicle interior cargo area wall. However, it is also contemplated to have the compression bearings 20 arranged within end caps, in both cassette or no cassette options, wherein the end caps are secured within brackets of the inner walls of the cargo area of the vehicle. Therefore, the compression bearings 20 and roll tube 14 of the shade drive 10 of the present invention may be used with or without end caps and with or without a cassette covering the roll tube 14 and shade panel 16 according to the present invention. The silicone cord 18 will greatly reduce weight and assembly time of the security shade 12 according to the present invention. It will further increase durability and robustness of the spring mechanism of the security shade 12 for the automotive manufacturer.

The present invention has been described in an illustrative manner, it is to be understood that the terminology which has been used is intended to be in the nature of words of description rather than that of limitation.

Many modifications and variations of the present invention are possible in light of the above teachings. Therefore, within the scope of the appended claims, the present invention may be practiced otherwise than as specifically described.

What is claimed is:

1. A shade drive for use with a rolling shade in a vehicle, said shade drive including:
    a roll tube;
    a cord arranged within said tube;
    a center bearing arranged around said cord and within said tube;
    a compression bearing arranged within each end of said roll tube, said compression bearing having an axle arranged within an end of an inner housing, said compression bearing having an outer housing, said outer housing rotatably fixed with respect to said roll tube, said compression bearing having a spring arranged between said axle and said inner housing, said inner housing and said axle being arranged within one end of said outer housing, said axle extends from an end of said outer housing;
    a male cord lock connected to an end of said axle; and
    a female cord lock arranged over said male cord lock, said male cord lock engaged with said cord and secured to said cord when said female cord lock slides over said male cord lock.

2. The shade drive of claim 1 wherein said cord is made of a silicone material.

3. The shade drive of claim 1 wherein said center bearing is fixed to said roll tube.

4. The shade drive of claim 3 wherein said center bearing is staked to said roll tube and will rotate with said roll tube.

5. The shade drive of claim 1 wherein a fastener rotatably secures said male cord lock to said axle, a second fastener rotatably secures said axle to said inner housing, said axle capable of axial movement with respect to said inner housing.

6. A security shade for use in a vehicle, said security shade including:
    a roll tube;
    a shade panel fixed to said roll tube at one end thereof;
    a cord arranged within said tube;
    a center bearing arranged within said tube, said center bearing having a generally cylindrical shape with an orifice through a midpoint thereof, said cord arranged through said orifice;
    a compression bearing arranged on an end of said tube, said compression bearing having an outer housing that is rotatably fixed with respect to said tube, said compression bearing having an axle arranged within an end of an inner housing, said inner housing arranged in one end of said outer housing, said axle extends from an end of said outer housing;
    a compression spring arranged between said axle and said inner housing;
    a male cord lock connected to an end of said axle; and
    a female cord lock arranged over said male cord lock, said male cord lock engaged with said cord, said female cord lock is rotatably fixed with respect to said cord.

7. The security shade of claim 6 wherein said cord is made of silicone.

8. The security shade of claim 6 wherein said center bearing is fixed to said roll tube at an approximate halfway point of said roll tube.

9. The security shade of claim 6 wherein said compression bearing arranged within an end cap.

10. The security shade of claim 6 wherein said cord twists with said tube when said shade panel is extended, said twisted cord will provide stored energy for use in returning said shade panel around said roll tube when said shade panel is retracted.

* * * * *